US008659771B2

(12) United States Patent
Babu

(10) Patent No.: US 8,659,771 B2
(45) Date of Patent: Feb. 25, 2014

(54) INCREASING INKJET PRINTER PAGE YIELD

(75) Inventor: Giddi Phani Babu, Beaverton, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1581 days.

(21) Appl. No.: 12/195,426

(22) Filed: Aug. 21, 2008

(65) Prior Publication Data

US 2009/0128596 A1 May 21, 2009

Related U.S. Application Data

(60) Provisional application No. 60/989,479, filed on Nov. 21, 2007.

(51) Int. Cl.
*G06F 3/12* (2006.01)
*B41J 2/195* (2006.01)
*B41J 29/38* (2006.01)

(52) U.S. Cl.
USPC .............................. 358/1.15; 347/7; 347/16

(58) Field of Classification Search
USPC ........................................ 358/1.15; 347/7, 16
See application file for complete search history.

(56) References Cited

U.S. PATENT DOCUMENTS

| 5,412,406 | A | 5/1995 | Fujimoto |
| 6,109,741 | A * | 8/2000 | Calatayud et al. .............. 347/85 |
| 6,805,502 | B2 | 10/2004 | Rai et al. |
| 6,906,810 | B2 | 6/2005 | Senay et al. |
| 7,113,303 | B2 | 9/2006 | Sesek et al. |
| 2002/0191039 | A1 * | 12/2002 | Minowa et al. .................. 347/7 |
| 2005/0200872 | A1 | 9/2005 | Newell et al. |
| 2005/0276618 | A1 * | 12/2005 | Clement et al. ................. 399/24 |
| 2006/0260741 | A1 | 11/2006 | Crum |
| 2006/0285159 | A1 * | 12/2006 | Frankel ....................... 358/1.16 |
| 2007/0092323 | A1 | 4/2007 | Lin et al. |
| 2007/0139666 | A9 | 6/2007 | Silverbrook et al. |
| 2007/0146772 | A1 | 6/2007 | Castellani |
| 2009/0027716 | A1 * | 1/2009 | Kuhn et al. .................. 358/1.15 |

* cited by examiner

*Primary Examiner* — Marivelisse Santiago Cordero
*Assistant Examiner* — Mesfin Getaneh

(57) ABSTRACT

A method for increasing a page yield of an inkjet printer that includes receiving a plurality of print jobs for printing at the inkjet printer, adding the plurality of print jobs to a job queue, calculating a first cumulative amount of ink for use by the inkjet printer to print on media for all of the plurality of print jobs at once, calculate a second cumulative amount of ink for use to maintain the inkjet printer for printing the plurality of print jobs at once, calculating a cumulative page yield for printing all of the plurality of print jobs in the job queue at once by the inkjet printer based on the calculated first and second cumulative amounts of ink, determining whether the cumulative page yield is greater than or equal to a predetermined threshold, and upon the determination that the cumulative page yield is greater than or equal to a predetermined threshold, directing the inkjet printer to print the plurality of print jobs at once.

20 Claims, 7 Drawing Sheets

INCREASING INKJET PRINTER PAGE YIELD

This application claims the benefit of provisional patent application Ser. No. 60/989,479, filed 21 Nov. 2007, titled "Increasing Inkjet Printer Page Yield," which application is incorporated by reference herein as if reproduced in full below.

BACKGROUND

Ink is used in a number of ways by an inkjet printer throughout an inkjet printing process. While most of the ink used by the printer is dedicated to printing on media the desired documents, such as photographs and other textual and graphic documents, some ink must be used for maintenance purposes to maintain the health of the printer. For example, some ink may be necessarily used to initialize and service the print head in the printer, some ink is residual and cannot be removed for use by the printer to print documents, and some ink evaporates during the operation and life of the printer.

Accordingly, printing efficiency is reflected in the ratio of the amount of ink available to print documents on media (papers, labels, etc.) and the amount of ink the printer uses for printer maintenance. Printing efficiency is commonly measured by page yield, which is defined as the average number of pages a printer can print per ink cartridge, which stores a given or predefined amount of ink for printer use. Page yield is affected by various known factors, such as the content that is printed, how the end of life of an ink cartridge is determined, how much time passes between print jobs (e.g., continuous printing versus start-and-stop printing), etc.

Different tests may be used to calculate or measure the page yield. Some of the common tests include calculating page yields for continuous printing and for intermittent or start-and-stop printing. For example, it has been estimated that a common user of an inkjet printer typically performs start-and-stop print jobs, each job a few pages at a time, with hours and sometimes days between each job. With start-and-stop printing, a typical inkjet printer must frequently use some ink to keep its print nozzles clear and ink flowing smoothly. The amount of ink used for such maintenance varies with the model or type of printer and the manufacturer of the printer.

As known in the art, maintenance in an inkjet printer mainly involves the cleaning of the inkjet nozzles or pens on the printhead to prevent the blockage of such nozzles by dry ink. Typically, when the nozzles are not used for a print job, they are covered with a protective cap to prevent moisture evaporating from the nozzles, which can dry up and harden the ink in the nozzles. However, this capping or seal is not perfect, and moisture can still escape from the nozzles. To combat this dry-ink problem, an inkjet printer typically provides out-of-cap services and into-cap services to reapply moisture to the nozzles on the printhead. That is, every time a print job is issued to the printer, the nozzles on the printhead are uncapped, and an out-of-cap service is performed on the nozzles based on how long they were capped. Once the print job is complete, an into-cap service is performed on the nozzles before they are moved into the protective cap. Based on the amount of ink used during the print job, a mid-job service also may be performed.

Algorithms used to service and maintain the nozzles typically include a combination of spitting and wiping. In a spitting process, drops of ink are fired through each of the nozzles to clear or purge the nozzles of ink clogs or occlusions and to reapply moisture to the printhead. The waste ink is collected at a spitting reservoir in the printer known as the "spittoon." In a wiping process, a flexible wiper (e.g., a rubber wiper blade) is swept across the printhead to spread the moisture evenly and remove ink residue as well as any dust or other debris that has collected on the printhead. The wiping process may be performed after spitting, uncapping, or occasionally during printing.

Because of more frequent maintenance of the inkjet printer for start-and-stop printing, page yields measured for typical start-and-stop printing are lower than those measured for continuous printing. It has been found that a page yield by a typical inkjet printer for continuous printing is as much as 150% more than a page yield for start-and-stop printing by the same printer. Prior solutions attempted to improve the page yield for start-and-stop printing by providing schemes wherein the inkjet nozzles or pens are left uncapped for a period of time after each print job in anticipation of another print job. Thus, to save ink, out-of-cap and into-cap services need not be performed on the printhead in between jobs. For example, after a print job is complete, the inkjet nozzles are left uncapped for two seconds in anticipation of another print job, after which the nozzles are capped. However, even if two print jobs are issued consecutively, there remains the possibility that the second print job may not meet the two-second deadline due to its size. Consequently, ink will be expended to perform both an into-cap service on the inkjet nozzles before they are capped and an out-of-cap service when they are uncapped for the second print job.

Accordingly, there is a desire to improve the printing efficiency of inkjet printers for both continuous and start-and-stop printing, so that the printer ink is maximally used for actual print jobs to print documents on media and minimally used to sufficiently maintain a reliable printing system that continues to deliver a desired print quality.

BRIEF DESCRIPTION OF THE DRAWINGS

Embodiments are illustrated by way of example and not limited in the following figure(s), in which like numerals indicate like elements, in which.

DETAILED DESCRIPTION

Figure 1:
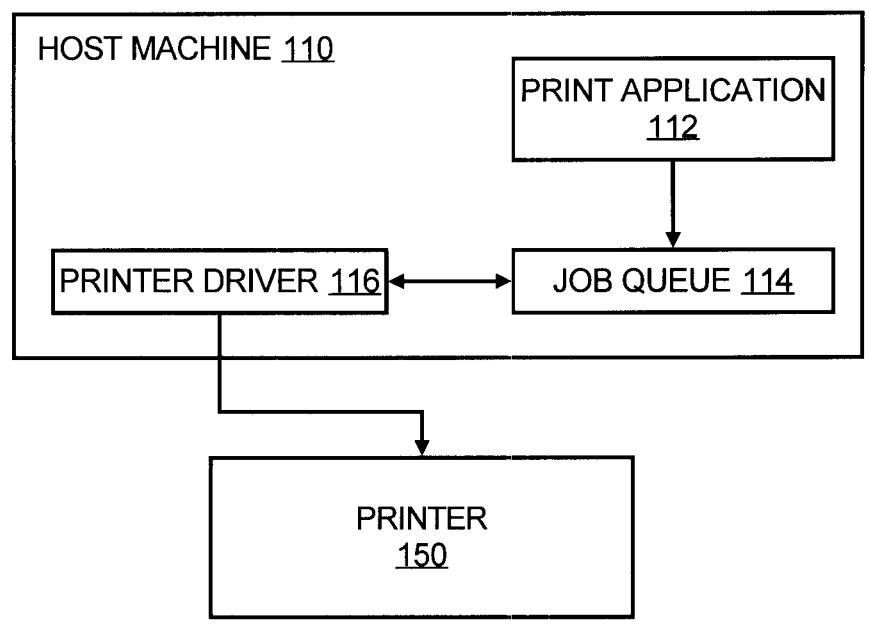
FIG. 1 illustrates a system block diagram for the creation of print job batches at the host machine, in accordance with one embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Described herein are systems and methods for improving the printing efficiency of an inkjet printer by increasing its page yield for start-and-stop printing. Such systems and methods also ensure that ink is used appropriately for printer maintenance to maintain the desired quality and reliability of the printer. As referred herein, an inkjet printer is a printer that employs an inkjet technology such as thermal inkjet, piezo-electric inkjet, continuous inkjet, or the like.

According to various embodiments described herein, inkjet printer jobs are printed in batches, which may be created either at the host machine(s) that issue the print jobs or at the inkjet printer that performs the print jobs. This is done to minimize the ink overhead associated with servicing the inkjet nozzles or pens on the printhead between print jobs. Thus, instead of printing each job as it is issued, a number of jobs are held in queue in anticipation for more jobs to print at once (that is, printing the jobs consecutively without stopping and starting between jobs) to raise the overall page yield of the inkjet printer. As referred herein, a host machine is any processing machine that is operable to send data and print commands to an inkjet printer to print the data. Examples of a host machine include but are not limited to a computer, a server, a mainframe computer, and any other computerized or computing electronic machine.

Also according to various embodiments described herein, a printer driver software application is implemented in the host machine(s), in the inkjet printer, or both to determine the amount of ink to be used for a print job and the amount of ink to be used to service and maintain the printer in good health, namely, the printhead and its inkjet nozzles or pens. This information may be obtained from prior empirical data obtained from the printing of different types of documents for the particular model/type or brand of the inkjet printer used. For example, a model X inkjet printer from a manufacturer brand Y on average uses 0.5 cubic centimeter (cc) of ink to print a text document but 2.0 cc of ink to print a photograph of the same size. Also, the amount of ink used by the same inkjet printer for servicing before and after each print job averages 0.3 cc. The above information is then used to determine the ratio of ink used for printing on media versus ink used for printer maintenance for printing each particular type of documents. These ratios are used to determine if a particular print job would result in a desired or acceptable page yield threshold for the printer. The page yield calculation may be performed in a manner known in the art, taking into consideration factors that affect the page yield as described earlier. The desired or acceptable page yield of a particular inkjet printer may be configured by the printer user or manufacturer, and such information is then used to prompt the printer user to add more print jobs to increase the page yield.

Because a printer's page yield varies based on the amount of ink the printer uses for actual printing and printer maintenance, the printer driver application may create and maintain a table of information or data that may be used to determine the desired or acceptable page yield of the inkjet printer. An example of such a data table is illustrated in Table 1, which shows different types of print jobs 1, 2, 3 (printing text documents, printing photographs, spreadsheets, etc.), the total ink used for each print job type, the amount of ink used for actual printing, the amount of ink used for printer maintenance (for pre- and post-printing servicing), and an acceptable ratio of ink used for printing vs. for maintenance in order to produce an acceptable page yield.

TABLE 1

| Type of print jobs | Total ink used | Ink used for printing document | Ink used to maintain printhead | Acceptable ratio of ink used for printing vs. for maintenance |
|---|---|---|---|---|
| 1 (for text document) | 1 cc | 0.8 cc | 0.2 cc | 80:20 |
| 2 (for photographs) | 2 cc | 1.5 cc | 0.5 cc | 85:15 |
| 3 (for spreadsheets) | 0.5 cc | 0.35 cc | 0.15 cc | 60:40 |

The amount of ink used for the type of print job is an approximation and may be based on empirical data previously collected from test printing such a print job on the printer. It should be understood that Table 1 can be further enhanced to include other factors that affect a printer's page yield, such as the number of pages printed for each print job type and, in the case of a color printer, the ink used for each color.

In one embodiment, the user specifies a deadline for a print job. The deadline provides a time at which the job needs to be printed. This deadline is used to postpone the printing of a given job until there are sufficient jobs in the job queue that results in an acceptable page yield. That is, print jobs will be held in the job queue until the deadline for one of the jobs expires, at which time a print batch is created to print all print jobs in the job queue. The creation of the print batch may be done by the host machine that issues the print job, by the printer, or by both. The maximum number of print jobs that may be held in a job queue is a function of the memory available in the host machine and the printer. The user also has the option to configure this maximum value.

FIG. 1 illustrates a block diagram of a system 100 that includes a host machine 110 in communication with an inkjet printer 150 for the creation of print job batches at the host machine, in accordance with one embodiment. The host machine 110 includes a print application 112 that issues a print job, a job queue 114 that receives and holds the print job, and a printer driver application 116 that controls the job queue and creates print job batches from the job queue to issue to the inkjet printer 150 for printing. The print application 112, the job queue 114, and the printer driver application 116 may be stored in a memory available in the host machine 110. Examples of the print application 112 include but are not limited to a word processing application, a spreadsheet application, a web browsing application, and a photo viewing application from which the user desires to print a document.

Figure 2:
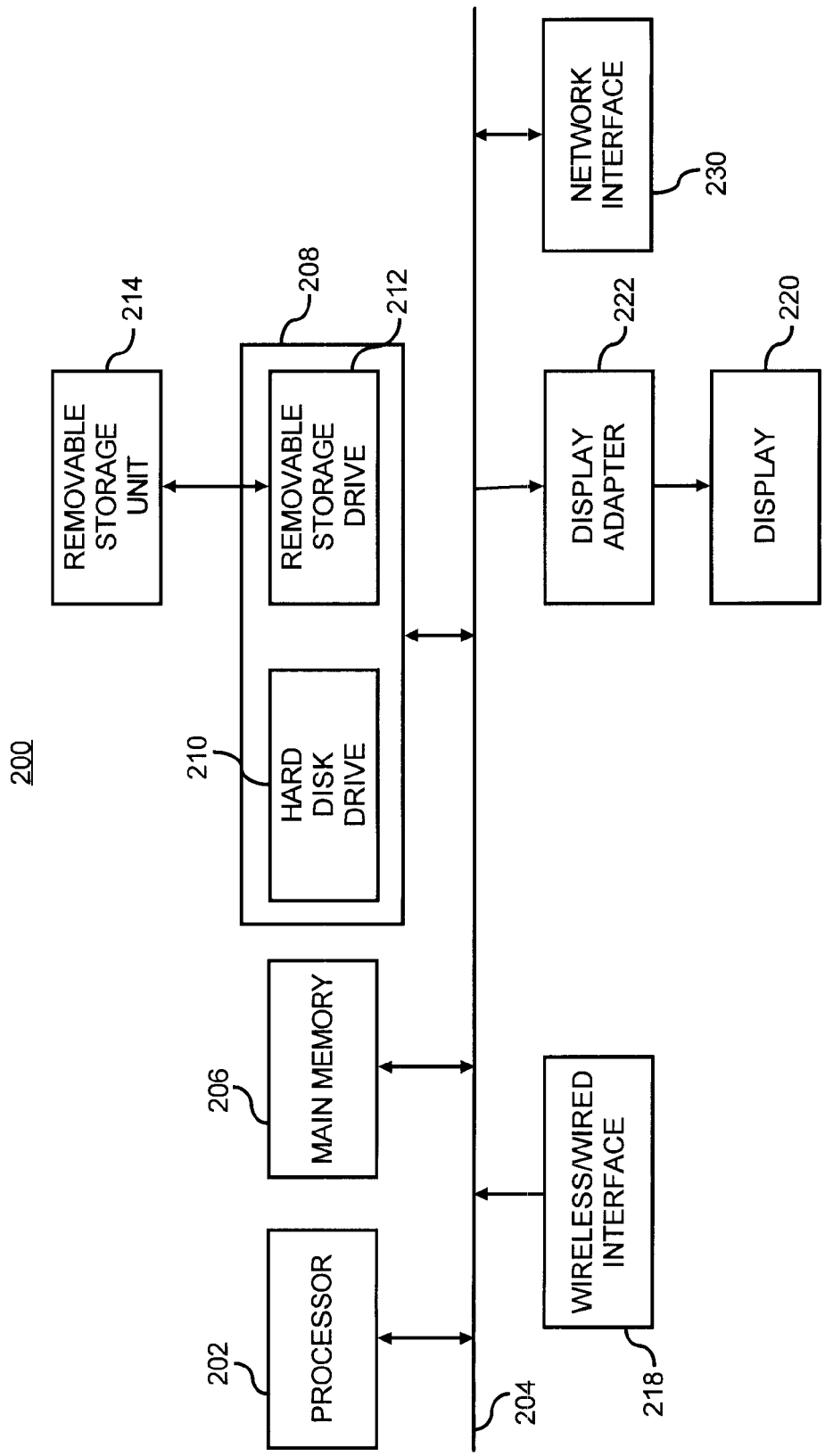
FIG. 2 illustrates a computerized system that is operable to be used as a platform for implementing a host machine that issues print jobs to a printer, in accordance with one embodiment.

FIG. 2 illustrates a block diagram of a computerized system 200 that is operable to be used as a platform for implementing the host machine 110. The computerized system 200 includes one or more processors, such as processor 202, providing an execution platform for executing software. Thus, the computerized system 200 includes one or more single-core or multi-core processors of any of a number of computer processors, such as processors from Intel, AMD, and Cyrix. As referred herein, a computer processor may be a general-purpose processor, such as a central processing unit (CPU) or any other multi-purpose processor or microprocessor. A computer processor also may be a special-purpose processor, such as a graphics processing unit (GPU), an audio processor, a digital signal processor, or another processor dedicated for one or more processing purposes. Commands and data from the processor 202 are communicated over a communication bus 204 or through point-to-point links with other components in the computer system 200.

The computer system 200 also includes a main memory 206 where software is resident during runtime, and a secondary memory 208. The secondary memory 208 may also be a computer-readable medium (CRM) that may be used to store software programs, applications, or modules to implement the print application 112, the job queue 114, and the printer driver application 116. The main memory 206 and secondary memory 208 (and an optional removable storage unit 214) each includes, for example, a hard disk drive and/or a removable storage drive 212 representing a floppy diskette drive, a magnetic tape drive, a compact disk drive, etc., or a nonvolatile memory where a copy of the software is stored. In one example, the secondary memory 408 also includes ROM (read only memory), EPROM (erasable, programmable ROM), EEPROM (electrically erasable, programmable ROM), or any other electronic, optical, magnetic, or other storage or transmission device capable of providing a processor or processing unit with computer-readable instructions.

The computer system 200 includes a display 220 connected via a display adapter 222, user interfaces comprising one or more input devices 218, such as a keyboard, a mouse, a stylus, and the like. However, the input devices 218 and the display 220 are optional. A network interface 230 is provided for communicating with other computer systems via, for example, a network.

Figure 3A:
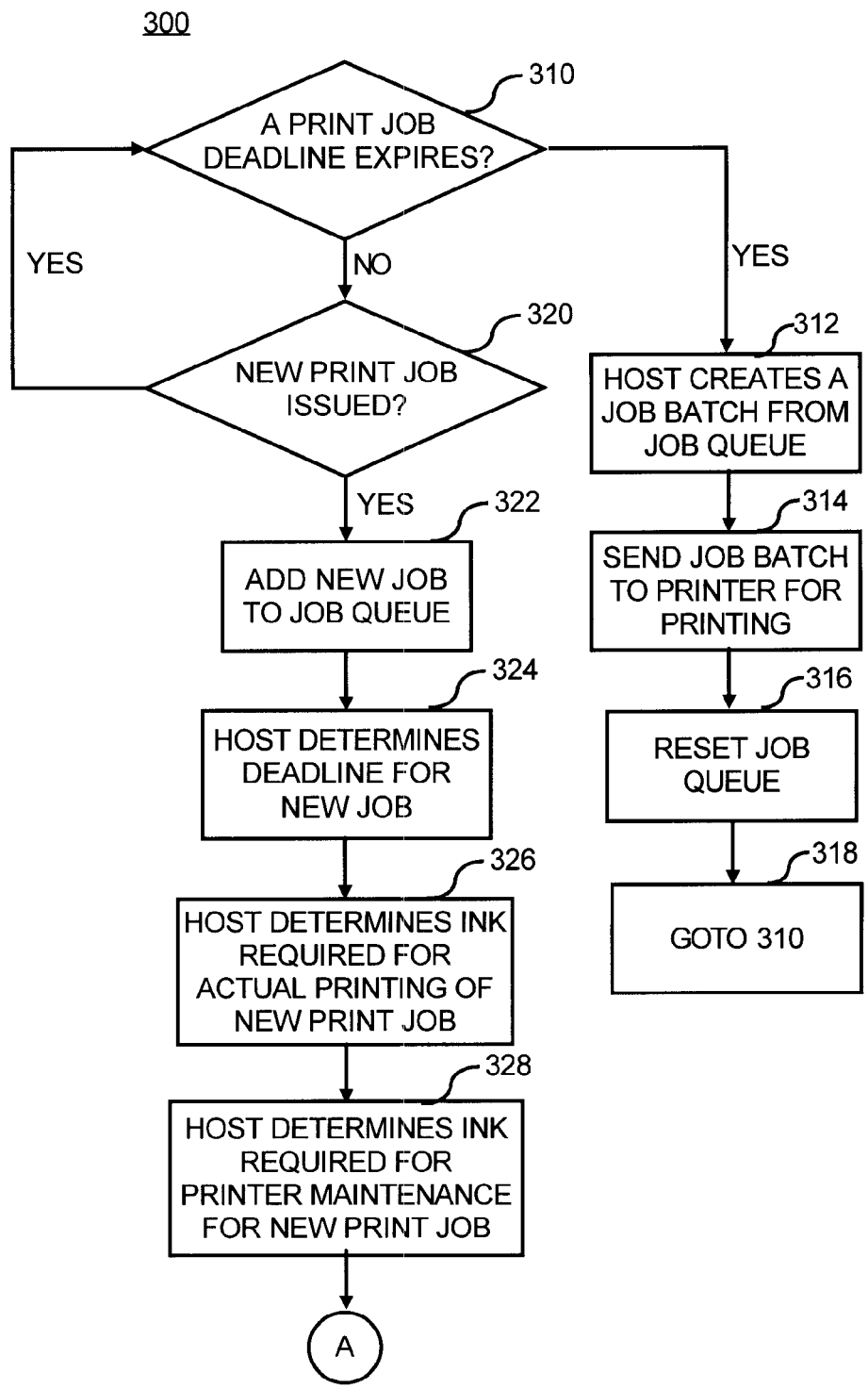
FIGS. 3A-B illustrate a method for increasing a page yield of an inkjet printer, in accordance with an embodiment.
Figure 3B:
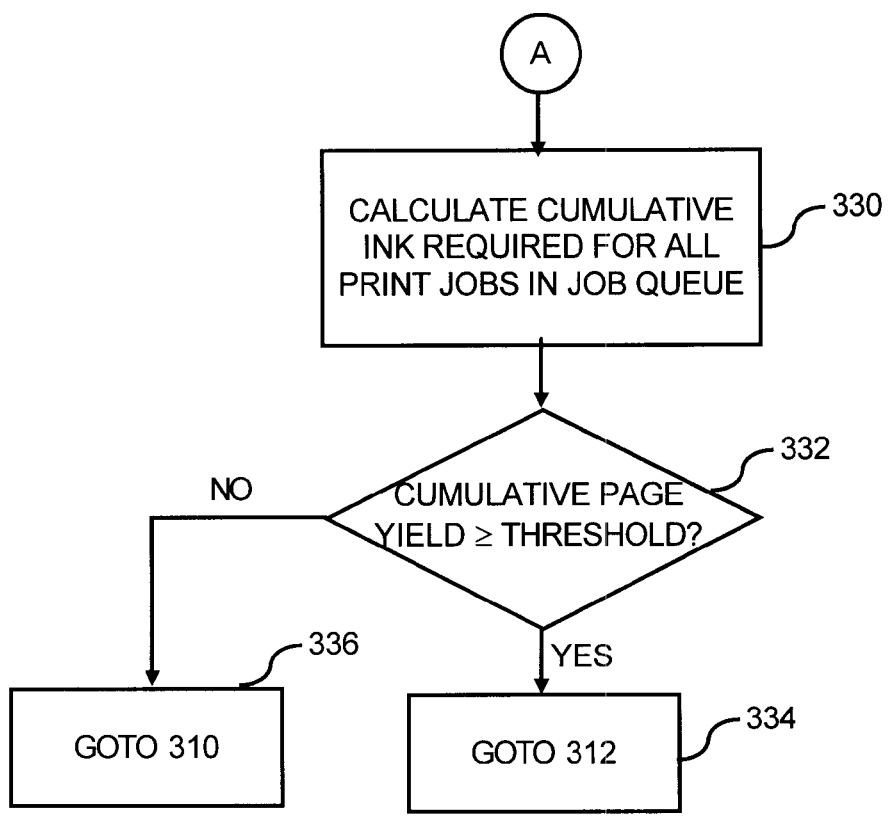

FIGS. 3A-B illustrate a process 300 for creating print job batches at a host machine to increase a page yield of an inkjet printer to an acceptable level, in accordance with one embodiment. For illustrative purposes and not to be limiting thereof, FIGS. 3A-B are described in the context of the system 100. It is assumed that the user already provided Table 1 and data therein to the host machine 110, or such information is otherwise made available and stored in a memory of the host machine (or otherwise accessible by the host machine) prior to the commencement of the process 300.

At 310, the printer driver application 116 determines whether a deadline of any print job in the job queue 114 has expired. For example, the job queue 114 may include a print job issued by an application, such as the print application 312, and an associated deadline for printing as provided by the user. At 312, if there is at least one print job in the job queue with an expired deadline, then the printer driver application 116 creates a job batch that includes all jobs in the job queue 114. At 314, the printer driver application 116 sends the created job batch to the printer 150 for printing. At 316, the printer driver application 116 resets the job queue 114 to indicate that it is empty of print jobs. At 318, the printer driver application 116 repeats the process 300 at 310.

Referring back to step 310, if no deadline of a print job in the job queue 114 has expired, the process 300 continues to 320. For example, if the job queue is initially empty or none of the print jobs in the job queue 114 has expired, then no deadline has expired. Accordingly, at 320, the printer driver application 116 next determines whether a new print job has been issued to the job queue 114. At this juncture, the printer driver application 116 may prompt the user to add more print jobs so as to improve the page yield of the printer. For example, as prompted by printer driver application 116, the user may have issued another print job, including a deadline for such a print job, through the print application 112. If no new print job has been issued, the process 300 is repeated at 310 again. However, at 322, if a new print job has been issued to the job queue 114, then the new print job is received by and added to the job queue 114. At 324, the printer driver application 116 determines the deadline for printing the new print job.

At 326, the printer driver application 116 determines the amount of ink required for actual printing on media by the new print job. This determination is based on an identification of the new print job and a look up of data in Table 1 to correlate the information. For example, the printer driver application 116 analyzes the new print job and identifies it as print job type 2 for printing a photograph. Based on this identification, the printer driver application 116 determines that approximately 1.5 cc is needed to print the photograph.

At 328, the printer driver application 116 also determines the amount of ink required to maintain the printer, namely, the printerhead and its ink nozzles, before and after the new print job as discussed earlier. This determination is also based on an identification of the new print job and a look up of data in Table 1 to correlate the information. For example, the printer driver application 116 analyzes the new print job and identifies it as print job type 2 for printing a photograph. Based on this identification, the printer driver application 116 determines that approximately 0.5 cc is needed for out-of-cap and into-cap servicings of the printerhead.

At 330, based on Table 1, the printer driver application 116 calculates the cumulative ink required for actual printing of all print jobs, including the new print job (based on the determination at 328 above), in the job queue and the ink required for printer maintenance if all of the print jobs are printed in a single job batch. For example, if the job queue includes 5 print jobs: 2 for documents, 1 for a photograph, and 2 for spreadsheets, the cumulative amount of ink used for actual printing of all print jobs is (0.8 cc*2)+1.5 cc+(0.35 cc*2)=3.8 cc, as based on Table 1. The printer will treat the batch of jobs as one, and it will not cap the inkjet nozzles between the jobs in the batch. Thus, the maximum amount of ink used for printer maintenance is estimated to be 0.5 cc, which is the maximum amount to be used for out-of-cap (pre-batch job) and into-cap (post-batch job) servicing for printing a photograph, as indicated in Table 1. In one embodiment, if the delay between print jobs in a job batch exceeds a desired or given limit or threshold, then a short out-of-cap servicing may be performed, and the amount of ink used for these short out-of-cap services are added to the amount of ink used for printer maintenance. The cumulative page yield is then calculated as the ratio of ink used to print all documents on media versus ink used for maintenance, or 3.8:0.5 in the above example.

At 332, the cumulative ratio of the calculated cumulative amounts of ink used for actual printing and printer maintenance is used to determine whether the cumulative page yield of the batch job is greater than or equal to a predetermined page yield threshold. In one embodiment, the predetermined page yield threshold is the highest of the acceptable ratios of ink used for printing versus for maintenance for the different types of print jobs in the job batch. In the example noted earlier, this; highest ratio is 85:15 for photograph printing jobs, as found in Table 1.

At 334, if the calculated cumulative ratio is greater than the predetermined page yield threshold, the process 300 is repeated at 312, wherein the printer driver application 116 creates a job batch from the job queue for printing by the printer, as described earlier with reference to 312-318. Otherwise, at 336, the process 300 is repeated at 310 as described above.

Figure 4A:
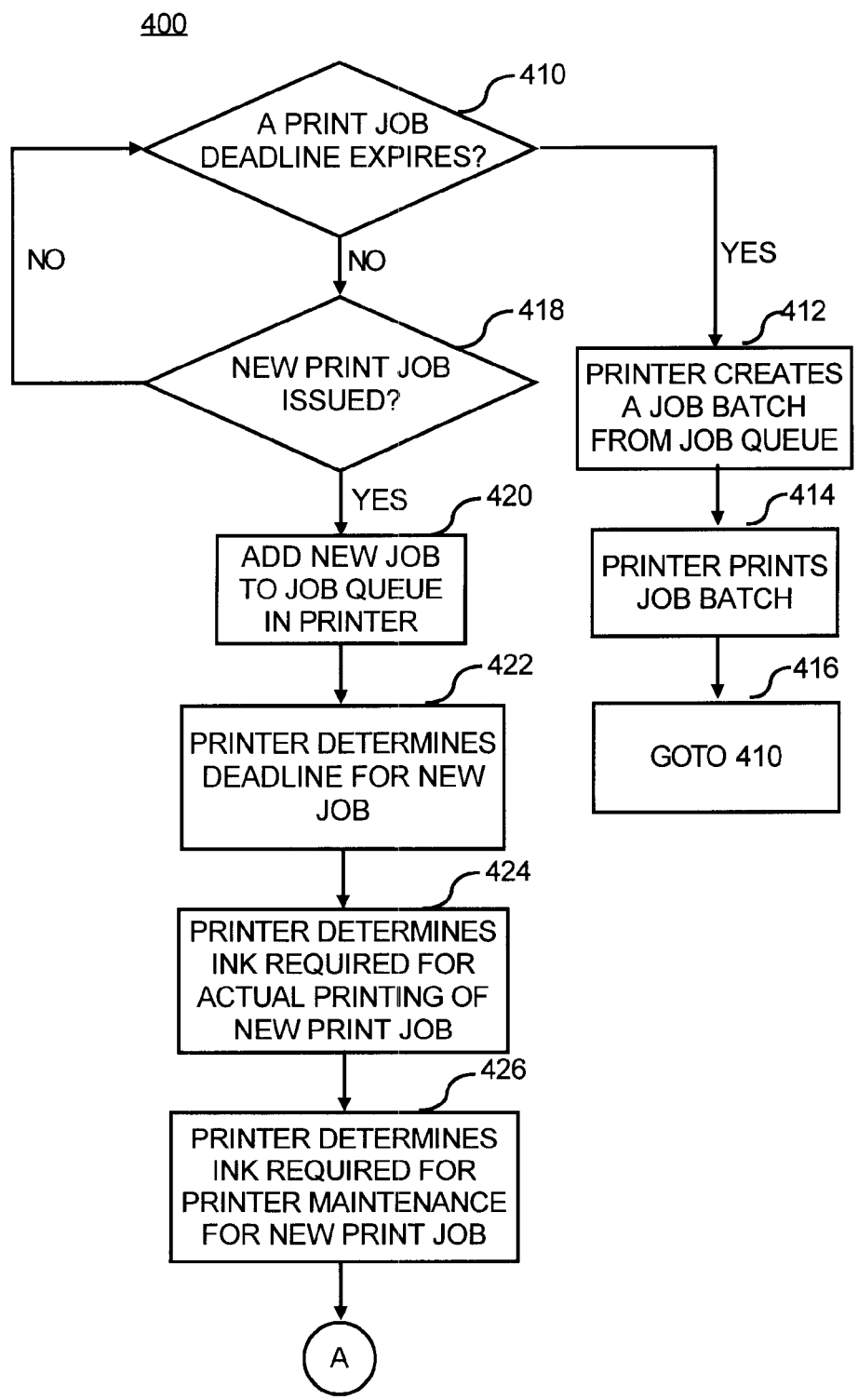
FIGS. 4A-B illustrate another method for increasing a page yield of an inkjet printer, in accordance with an embodiment.
Figure 4B:
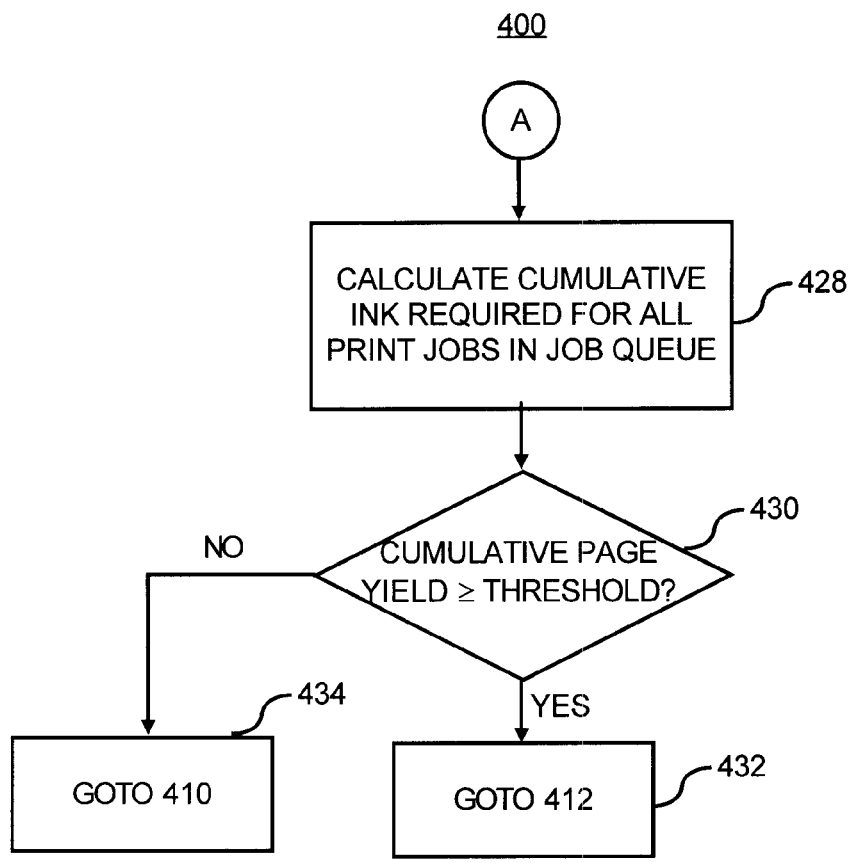
Figure 5:
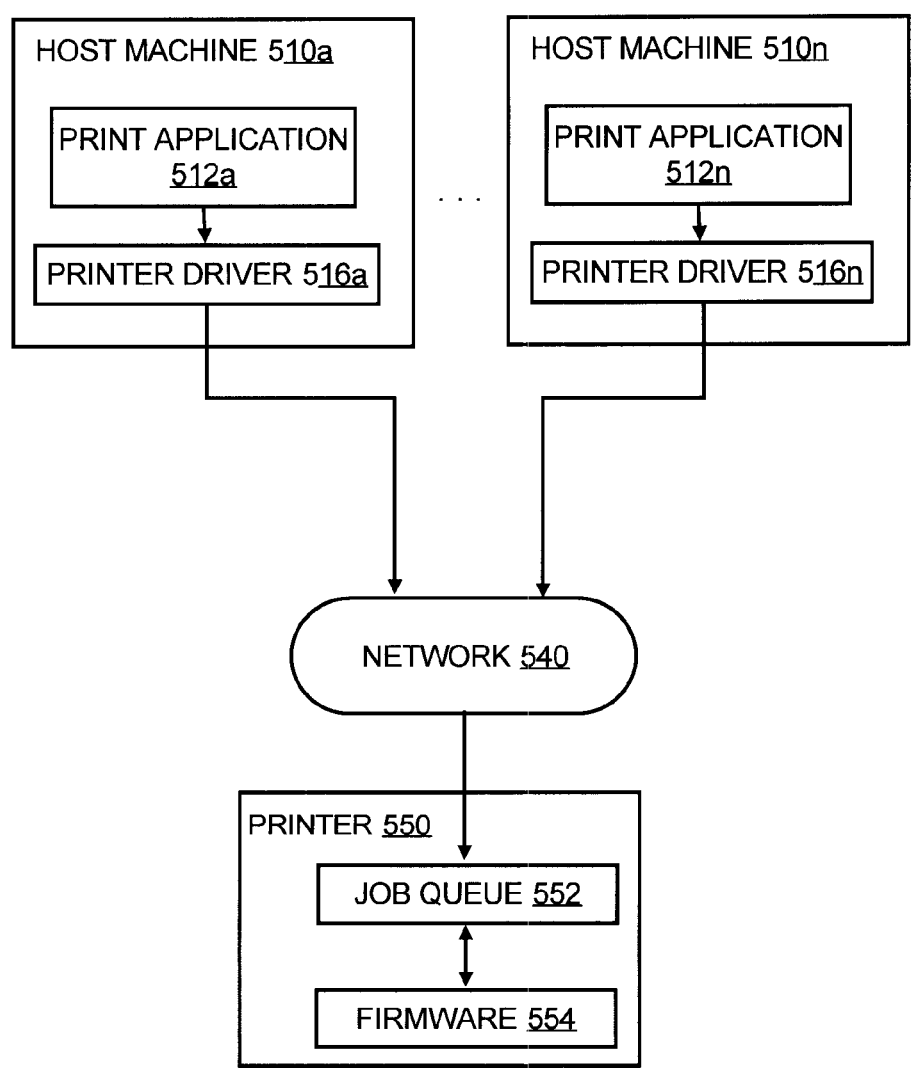
FIG. 5 illustrates a diagram of a networked system having multiple host machines connected to an inkjet printer via a network, in accordance with an embodiment.

FIGS. 4A-B illustrate a process 400 for creating print job batches at an inkjet printer, rather than at the host machine, to increase a page yield of an inkjet printer to an acceptable level, in accordance with one embodiment. This process is useful when the inkjet printer is set up as a networked printer that provides printing for multiple host machines on the network. FIG. 5 illustrates such a networked system 500 with multiple host machines 510a-n connected to an inkjet printer 550 via a network 540, such as the Internet or an Intranet such as local area network (LAN) or any other data network known in the art.

As illustrated, each host machine (510a-n) includes a print application (512a-n) similar to the print application 112 in the system 100 (FIG. 1). Each host machine also includes a printer driver application (516a-n) that provides a proper interface for communicating with the printer 550 via the network 540. However, because the printer 550 is now tasked with creating print job batches in this embodiment, it includes a job queue 552 to hold print jobs at the printer, rather than at one of the host machines, as described above in the process 300 (FIGS. 3A-B). The job queue 552 may be stored in an available memory device, such as a memory chip or hard drive, in the printer. The printer 550 also includes firmware 554 that controls the job queue 552 and creates job batches from jobs stored in the job queue 552. As with the job queue 552, the firmware 554 may be stored in an available memory device in the printer. Although the firmware 554 is described herein, it should be understood that the software application for controlling the job queue 552 may be any type of software application executable in the printer 550.

For illustrative purposes and not to be limiting thereof, the process 400 in FIGS. 4A-B are now described in the context of the system 500 (FIG. 5). It is assumed that the user already provided Table 1 and data therein to the printer 550, or such information is otherwise made available and stored in the host machine prior to the commencement of the process 300. At 410, the printer firmware 554 determines whether a deadline of any print job in the job queue 552 in the printer has expired. At 412, if there is at least one print job in the job queue with an expired deadline, then the firmware 554 creates a job batch that includes all print jobs in the job queue 114 that have expired deadlines. Thus, this may include the firmware 554 sorting of all print jobs in the job queue 552 based on job deadlines before creating the job batch. At 414, the firmware 554 directs the printer 550 to print all print jobs in the created job batch at once. At 416, the process 400 is repeated at 410.

Referring back to 410, if no deadline of a print job in the job queue 552 has expired, the process 400 continues to 418. For example, if the job queue is initially empty or none of the print jobs in the job queue 114 has expired, then no deadline has expired. Accordingly, at 418, the firmware 552 next determines whether a new print job has been issued to the job queue 114. At this juncture, the firmware 552 may send a signal to one or more of the host machines 510a-n to prompt users at the host machines to issue more print jobs to the printer 550 so as to improve the page yield of the printer. For example, as prompted by the printer 550, a user at one or more host machines 510a-n may have issued one or more print jobs, including associated deadlines for such print jobs. for printing by the printer 550. If no new print job has been issued, the process 400 is repeated at 410 again. However, at 420, if a new print job has been issued to the job queue 114, then the new print job is added to the job queue 114.

At 422, the firmware 554 determines the deadline for printing the new print job. At 424, the firmware 554 determines the amount of ink required for actual printing on media by the new print job. This determination is based on an identification of the new print job and a look up of data in Table 1 to correlate the information. For example, the firmware 554 analyzes the new print job and identifies it as print job type 2 for printing a photograph. Based on this identification, the firmware 554 determines that approximately 1.5 cc is needed to print the photograph. At 426, the firmware 554 also determines the amount of ink required to maintain the printer, namely, the printerhead and its ink nozzles, before and after the new print job as discussed earlier. This determination is also based on an identification of the new print job and a look up of data in Table 1 to correlate the information. For example, the firmware 554 analyzes the new print job and identifies it as print job type 2 for printing a photograph. Based on this identification, the firmware 554 determines that approximately 0.5 cc is needed for out-of-cap and into-cap servicings of the printerhead.

At 428, based on Table 1, the firmware 554 calculates the cumulative ink required for actual printing on media of all print jobs, including the new print job, in the job queue and the ink required for printer maintenance if all of the print jobs are printed in a single job batch. For example, if the job queue includes 5 print jobs: 2 for documents, 1 for a photograph, and 2 for spreadsheets, accordingly, the cumulative amount of ink used for actual printing of all print jobs is (0.8 cc*2)+1.5 cc+(0.35 cc*2)=3.8 cc, as based on Table 1. The printer will treat the batch of jobs, as one, and it will not cap the inkjet nozzles between the jobs in the batch. Thus, the maximum amount of ink used for printer maintenance is estimated to be 0.5 cc, which is the maximum amount to be used for out-of-cap (pre-batch job) and incap (post-batch job) servicing for printing a photograph, as indicated in Table 1. In one embodiment, if the delay between print jobs in a job batch exceeds a desired or given limit or threshold, then a short out-of-cap servicing may be performed, and the amount of ink used for these short out-of-cap services are added to the amount of ink used for printer maintenance.

At 430, the cumulative ratio of the calculated cumulative amounts of ink used for actual printing and printer maintenance is used to determine whether the cumulative page yield of the batch job is greater than or equal to a predetermined page yield threshold. In one embodiment, the predetermined page yield threshold is the highest of the acceptable ratios of ink used for printing versus for maintenance for the different types of print jobs in the job batch. In the example noted earlier, this, highest ratio is 85:15 for photograph printing jobs, as found in Table 1.

At 432, if the calculated cumulative ratio is greater than the predetermined page yield threshold, the process 400 is repeated at 412, wherein the firmware 554 creates a job batch for all print jobs in the job queue for printing by the printer, as described earlier with reference to 412-416. Thus, unlike the process 300, the process 400 at 412 operates to create a job batch from only those print jobs in the job queue that have expired or all print jobs in the job queue. Otherwise, at 434, the process 400 is repeated at 410 as described above.

An alternative embodiment is contemplated wherein job batches may be created jointly by both the host machine and an inkjet printer on which the job batches are to be printed, and the process is similar to the process 300 illustrated in FIG. 3. In this alternative embodiment, both the host machine (e.g., 110 in FIG. 1) and the printer (e.g., 150 in FIG. 1) include a job queue. However, the difference is at 330, wherein the printer driver application (e.g., 116 in FIG. 1) calculates the cumulative ink required (for both actual printing and printer maintenance) for all print jobs in both the job queue in the printer and the job queue in the host machine. At 332, if the cumulative page yield based on the calculation at 330 is greater than or equal to a predetermined or given page yield threshold, the printer driver application will transfer those print jobs in the job queue of the host machine to those in the job queue in the printer. These jobs are then combined as a single job batch for printing as described at 312-318 in FIG. 3A.

Accordingly, as described in various embodiments provided herein, the implementation of print batches to print multiple print jobs in each print batch at once to an inkjet printer enables the inkjet printer to increase its page yield and reduces the cost for using and maintaining such a printer.

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method comprising:
receiving a plurality of print jobs for printing at the inkjet printer;
adding the plurality of print jobs to a job queue;
calculating a first cumulative amount of ink for use by the inkjet printer to print on media for all of the plurality of print jobs at once;
calculating a second cumulative amount of ink for use to maintain the inkjet printer for printing the plurality of print jobs at once;
calculating a cumulative page yield for printing all of the plurality of print jobs in the job queue at once by the inkjet printer based on the calculated first and second cumulative amounts of ink;
determining whether the cumulative page yield is greater than or equal to a predetermined page yield threshold, wherein the predetermined page yield threshold is based on a predetermined ratio of ink for use by the inkjet printer for printing versus a predetermined amount of ink to maintain the inkjet printer; and
upon the determining that the cumulative page yield is greater than or equal to the predetermined page yield threshold, directing the inkjet printer to print the plurality of print jobs at once.

2. The method of claim 1, wherein upon the determining that the cumulative page yield does not reach the predetermined page yield threshold, determining whether a deadline for printing one of the plurality of print jobs in the job queue has expired.

3. The method of claim 1, further comprising:
determining a deadline for printing each of the plurality of print jobs in the job queue.

4. The method of claim 3, wherein upon determining that the deadline for printing one of the plurality of print jobs has expired, directing the inkjet printer to print the plurality of print jobs at once.

5. The method of claim 3, wherein upon determining that the deadline for printing one of the plurality of print jobs has not expired,
delaying a printing by the inkjet printer of the plurality of print jobs in the job queue; and
determining whether a new print job has been issued.

6. The method of claim 5, wherein upon the determining that the new print job has been issued,
adding the new print job to the job queue; and
determining a first amount of ink to be used by the inkjet printer for printing on media for the new print job in the job queue; and
determining a second amount of ink to be used to maintain the inkjet printer for the printing of the new print job.

7. The method of claim 5, wherein upon determining that the deadline for printing one of the plurality of print jobs has not expired, the method further comprises:
prompting a user to issue one or more new print jobs.

8. The method of claim 1, further comprising:
implementing the job queue in a host machine that issues the plurality of print jobs for printing by the inkjet printer.

9. The method of claim 1,
wherein calculating a cumulative page yield for printing all of the plurality of print jobs in the job queue at once is based on a ratio between the calculated first and second cumulative amounts of ink.

10. The method of claim 1, further comprising:
implementing the job queue combined from a first job queue implemented in a host machine that issues the plurality of print jobs for printing by the inkjet printer and a second job queue implemented in the inkjet printer to receive print jobs issued by the host machine.

11. The method of claim 1, wherein calculating the second cumulative amount of ink comprises:
calculating the second cumulative amount of ink to include ink used for an out-of-cap service on a printerhead of the inkjet printer prior to a printing of the plurality of print jobs and ink used for an into-cap service on the printerhead subsequent to a completion of a printing at once of the plurality of print jobs.

12. The method of claim 1, wherein directing the inkjet printer to print the plurality of print jobs at once comprises:
creating a job batch that includes the plurality of print jobs in the job queue;
forwarding the job batch to the inkjet printer for printing the plurality of print jobs therein at once; and
emptying the job queue of the plurality of print jobs.

13. The method of claim 1, further comprising:
determining a first amount of ink for use by the inkjet printer to print on media for each of the plurality of print jobs in the job queue; and
determining a second amount of ink for use to maintain the inkjet printer for the printing of each of the plurality of print jobs.

14. The method of claim 13, wherein calculating the first cumulative amount of ink comprises:
calculating the first cumulative amount of ink based at least on the determined first amount of ink for each of the plurality of print jobs.

15. The method of claim 1, wherein calculating the second cumulative amount of ink comprises:
calculating the second cumulative amount of ink based at least on one of the determined second amounts of ink for the plurality of print jobs.

16. A system comprising:
an inkjet printer that networks with a plurality of host machines via a network, the inkjet printer including:
a job queue that receives and holds print jobs issued by the plurality of host machines; and
an application that controls the job queue to create a job batch of at least some of the print jobs when a cumulative page yield of the job batch is greater than or equal to a predetermined page yield threshold,
wherein the cumulative page yield is calculated based on an amount of ink for use by the inkjet printer to print the print jobs in the job batch and an amount of ink for use to maintain the inkjet printer in relation to printing the print jobs in the job batch, and
wherein the predetermined page yield threshold is based on a predetermined ratio of ink for use by the inkjet printer for printing versus ink to maintain the inkjet printer and wherein the application further directs the inkjet printer to print all print jobs in the job batch at once.

17. The networked system of claim 16, wherein the application is included in a firmware of the inkjet printer.

18. The networked system of claim 16, wherein the application operates to determine a deadline for printing each of the print jobs in the job queue and to sort the print jobs in the job queue based on their printing deadlines.

19. The networked system of claim 16, wherein one of the plurality of host machines includes a job queue and a printer driver application that control the job queue in the one host machine to create a job batch for printing at once, wherein the job batch includes one print job in the job queue in the one host machine and one print job in the job queue of the inkjet printer.

20. A non-transitory computer readable medium on which is encoded program code for execution by a computer to:
receive a plurality of print jobs for printing at the inkjet printer;
add the plurality of print jobs to a job queue;
calculate a first cumulative amount of ink for use by the inkjet printer to print on media for all of the plurality of print jobs at once;
calculate a second cumulative amount of ink for use to maintain the inkjet printer for printing the plurality of print jobs at once;
calculate a cumulative page yield for printing all of the plurality of print jobs in the job queue at once by the inkjet printer based on the calculated first and second cumulative amounts of ink;
determine whether the cumulative page yield is greater than or equal to a predetermined page yield threshold, wherein the predetermined page yield threshold is based on a predetermined ratio of ink for use by the inkjet printer for printing versus of ink to maintain the inkjet printer; and
upon the determination that the cumulative page yield is greater than or equal to the predetermined page yield threshold, direct the inkjet printer to print the plurality of print jobs at once.

* * * * *

UNITED STATES PATENT AND TRADEMARK OFFICE
CERTIFICATE OF CORRECTION

| | | |
|---|---|---|
| PATENT NO. | : 8,659,771 B2 | Page 1 of 1 |
| APPLICATION NO. | : 12/195426 | |
| DATED | : February 25, 2014 | |
| INVENTOR(S) | : Giddi Phani Babu | |

It is certified that error appears in the above-identified patent and that said Letters Patent is hereby corrected as shown below:

In the Claims

In column 9, line 18, in Claim 1, delete "method" and insert -- method, --, therefor.

Signed and Sealed this
Eighteenth Day of November, 2014

Michelle K. Lee
*Deputy Director of the United States Patent and Trademark Office*